United States Patent [19]

Taig

[11] 4,204,554
[45] May 27, 1980

[54] FLUID CONTROL MEANS

[75] Inventor: Alistair G. Taig, South Bend, Ind.

[73] Assignee: The Bendix Corporation, Southfield, Mich.

[21] Appl. No.: 883,549

[22] Filed: Mar. 6, 1978

[30] Foreign Application Priority Data

Mar. 8, 1977 [GB] United Kingdom ............... 09624/77

[51] Int. Cl.² ........................................... G05D 11/03
[52] U.S. Cl. ........................................ 137/101; 91/51
[58] Field of Search ..................... 137/98, 101, 118; 91/51

[56] References Cited

U.S. PATENT DOCUMENTS

| | | | |
|---|---|---|---|
| 2,242,002 | 5/1941 | Klein | 137/101 |
| 2,923,309 | 2/1960 | Allen | 137/118 |
| 3,348,563 | 10/1967 | Sidles | 137/101 |
| 3,605,785 | 9/1971 | Dobritz | 137/101 |
| 3,729,014 | 4/1973 | Narumi | 137/101 |
| 3,823,556 | 7/1974 | Goto | 137/118 X |
| 4,038,998 | 8/1977 | Taig | 137/101 |

*Primary Examiner*—Robert G. Nilson
*Attorney, Agent, or Firm*—Paul D. Schoenle; Ken C. Decker

[57] ABSTRACT

A flow divider valve cooperates with a housing to control flow between an input port, a first output port and a second output port. The valve defines a first land and a second land and is movable within the housing to a first position wherein flow is decreased to the first output port and increased to the second output port, and to a second position wherein flow is decreased to the second output port and increased to the first output port. Movement of the valve to the first and second positions is controlled by pressure within the first and second output ports. A passage on the valve communicates flow to both sides of the valve.

3 Claims, 3 Drawing Figures

FLUID CONTROL MEANS

This invention relates to fluid control means, and more especially to means for controlling the passage of fluid between an input and two outputs, and in particular from the input preferentially towards the output presenting the higher back-pressure to fluid flow.

Such fluid control means may be employed in place of the fluid flow divider means described with reference to FIG. 16 of U.S. Pat. No. 3,875,966, and so the present invention provides one possible solution to the problem of providing a fluid flow divider means which concentrates pressurised fluid from an input towards the one of two outputs presenting the higher back-pressure tending to retard fluid flow.

According to the present invention there is provided a fluid flow controlling flow divider comprising a generally symmetrical valve port having two seats and being resiliently mounted for movement between outflow passages with which said seats respectively cooperate, a fluid flow input port connected to the input sides of both valve seats and the resilient mounting means presenting on one side and the other side thereof appreciable respective areas to fluid pressure via the outflow passages downstream of said seats.

Preferably the resilience of mounting means for the valve member is such as to bias the valve member towards a central position.

In order that the invention be more clearly understood and readily put into effect, the same will now be described by way of examples, with reference to the accompanying drawing wherein.

Figure 1:
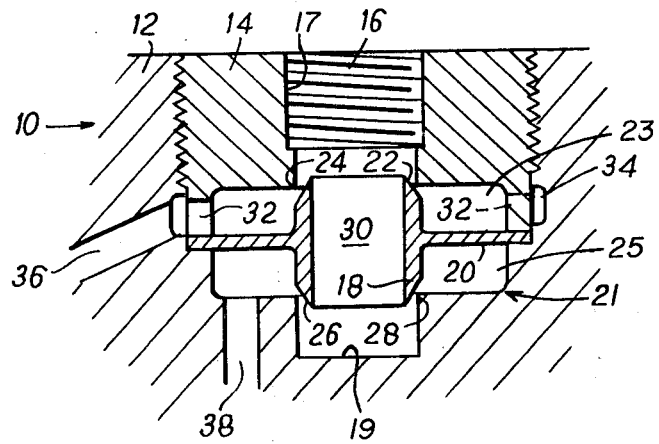
FIG. 1 is a cross-section in a plane including the central axis of the first embodiment.

Referring first to FIG. 1, a first embodiment of fluid control means in accordance with the invention comprises a hollow body 10 formed by a casting or moulding 12 having screw-threaded into a generally circular cylindrical cavity therein, an open-centre plug 14. The screw-threaded bore 16 of the plug 14 forms an input port of the control means.

Within the hollow of the body 10 to a double-seat valve member 18 is centrally mounted by means of an integral resilient diaphragm 20 clamped in the casting 12 by the plug 14. Valve member 18 and its integral diaphragm 20 is fabricated from stainless steel, but in other examples it might be synthetic rubber. The diaphragm 20 is deflectable in one direction to a first extreme position (not shown) of the valve member 18, a first conical valve land 22 on the end of the valve member 18 sealingly engages a lesser-diameter edge 24 of a step-change in the bore of the hollow formed in the body 10. On deflection to the opposite position of the valve member 18, a second conical valve land 26 on the end of the valve member 18 sealingly engages a further lesser-diameter edge 28 of a step-change in the bore of the hollow formed in the body 10. A wide-bore passage 30 in the valve member 18 allows fluid, such as pressurised hydraulic oil, arriving at the input ports 16 to freely communicate with both ends of the valve member 18.

Leading away from the upper side of the diaphragm 20, via gaps 32 in the bottom edge of the plug 14 and an annular channel 34 in the casting 12, is a first output port 36 formed in the body 10. Leading away from the lower side of the diaphragm 20 is a second output port 38 formed in the body 10.

The body 10 forms a blind bore 17 leading from the input port 16 to a bottom wall 19. The blind bore intersects a chamber 21 wherein the valve member and diaphragm 20 are disposed. The diaphragm separates the chamber 21 into a first cavity 23 and a second cavity 25. The first cavity communicates with the input port via the clearance between land 22 and edge 24 and also communicates with the first output port 36. The second cavity communicates with the input port via passage 30 and the clearance between land 26 and edge 28 and also communicates with the second output port 38. The valve member 18 defines a cylindrical center portion having an axis coaxial with the blind bore 17 and the input port 16.

In the median position of the valve member 18, the co-operations of the first valve land 22 with the edge 24, and of the second valve land 26 with the further edge 28, substantially equally throttle flow of fluid from the input port 16 to the first and second output ports 36 and 38. As the valve member 18 moves away from its median position towards its first extreme position (engagement of the first valve land 22 with the edge 24), flow of fluid from the input port 16 to the first output port 36 is increasingly throttled while the flow of fluid from the input port 16 via the passge 30 to the second output port 38 suffers lesser throttling due to the increasing gap between the second valve land 26 and the further edge 28. Conversely, as the valve member 18 moves away from its median position towards its second extreme position (engagement of the second valve land 26 with the further edge 28), flow of fluid from the input port 16 to the second output port 38 is increasingly throttled while the flow of fluid from the input port 16 to the first output port 36 (via the gaps 32 and the channel 34) suffers lesser throttling due to the increasing gap between the first valve land 22 and the edge 24.

It will be clear from FIG. 1 that the back-pressure at the first output port 36 acts on the upper-side of the diaphragm 20, while the back-pressure at the second output port 38 acts on the under-side of the diaphragm 20, and in each case, also act to a certain extent directly on the valve member 18. Thus when the back-pressure in the first output port 36 is greater than the back-pressure in the second output port 38, there will be a net downward force on the diaphragm 20 so biasing the valve member 18 towards its second extreme position, which, in turn, will increasingly throttle fluid flow from the input port 16 to the second output port 38 while increasingly opening the first output port 36 to flow of fluid from the input port 16. Conversely, when the back-pressure in the second output port 38 is greater than the back-pressure in the first output port 36, there will be a net upward force on the diaphragm 20, a biasing the valve member 18 towards its first extreme position, which, in turn, will increasingly throttle flow from the input port 16 to the first output port 36 while increasingly opening the second output port 38 to flow of fluid from the input port 16. Thus, in each case, fluid flow will be directed from the input port 16 towards whichever one of the output ports 36 and 38 presents the mutually higher back-pressure.

Figure 3:
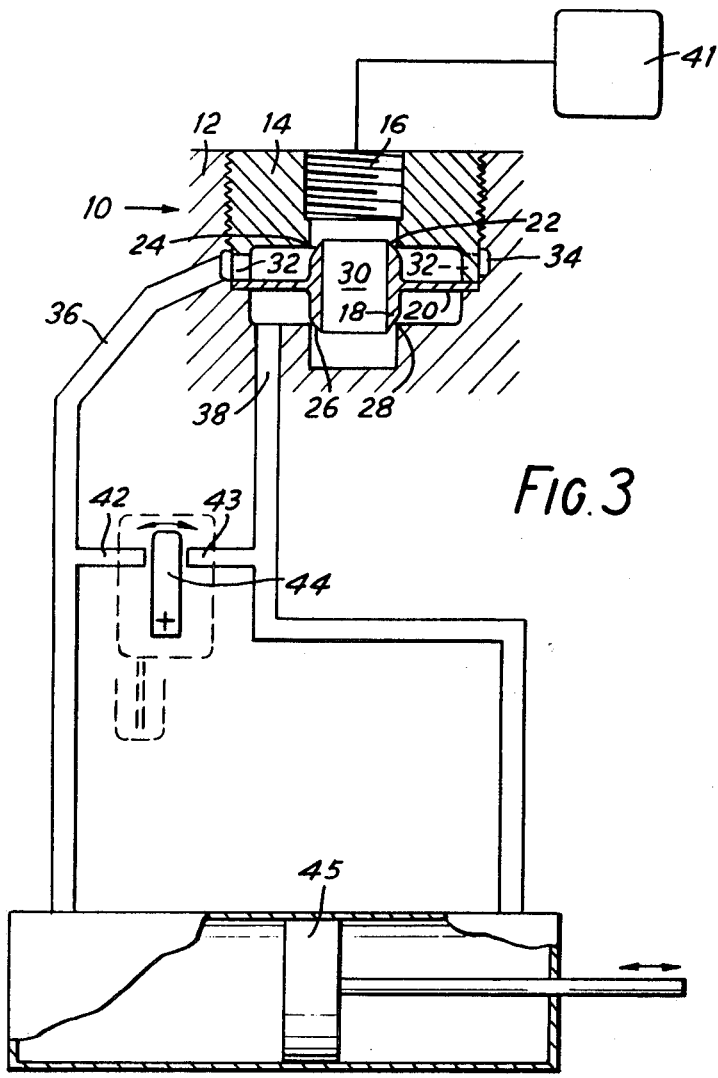
FIG. 3 illustrates in schematic form a power assistance apparatus employing a flow divider as shown in FIG. 1.

One example of use of the flow divider is in a fluid pressure operated power assistance mechanism which might be employed in automobile steering. In FIG. 3, the flow divider of FIG. 1 is shown connected to an hydraulic pump denoted by reference 41, the two output passages 36 and 38 being connected to two like inputs 42 and 43 of a valve device 44 which includes a valve member 44 coupled to the steering column of the automobile. Turning the column in one direction tends to close-off input passage 42 and turning the column in the other direction tends to close-off passage 43. The closed passage of passage 42 tends to cause increase of pressure in passage 36 and the nature of operation of the flow divider being such as to concentrate flow into the higher pressure passage, this actuates an hydraulic actuator 45 in an appropriate sense to assist the manual steering force. Such an hydraulic power assistance control device is described in more detail with reference to FIGS. 10(a) and 10(b) thereof in the Specification of U.S. Pat. No. 3,875,966.

The fluid control means shown in FIG. 1 may be modified in several ways. For example, instead of the passage 30 communicating incoming fluid to either end of the valve member 18, the valve member 18 may be solid and there may be a passage or series of passages (not shown) leading from the input port 16 radially outwards through the plug 14 and into the casting or moulding 12, thence downwards outside the channel 34, radially inwards to or nearly to the central axis of the control means, and then upwards into the volume beneath the lower end of the valve member 18 so that both ends thereof are freely subject to the fluid arriving at the input port 16. As a further alternative, there may be a further input port (not shown) leading directly to the volume beneath the lower end of the valve member 18 (which would be solid and not have the passage 30 therein), the input port 16 and this further input port being hydraulically connected together externally of the control means.

Figure 2:
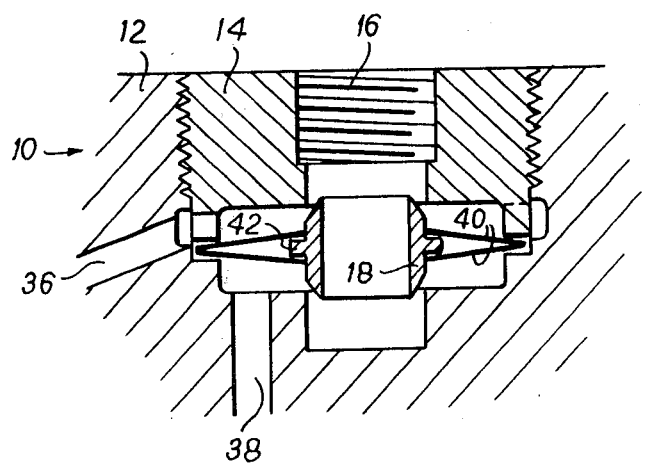
FIG. 2 is a cross-section in a plane including the central axis of the second embodiment.

Referring now to FIG. 2, this shows a second embodiment of fluid control means in accordance with the invention. This second embodiment is identical in many respects with the first embodiment (FIG. 1), and like parts are given the same reference numerals. The embodiment of FIG. 2 differs from the embodiment of FIG. 1 in that instead of being resiliently mounted by a resilient diaphragm, the valve member 18 is resiliently mounted by means of two slightly dished thin spring steel washers 40, peripherally clamped between the casting 12 and the plug 14 and engaging the valve member 18 by means of a waist ring 42 provided thereon. The washers 40, which may be suitably dimensioned Belleville washers, mount and guide the valve member 18 for reciprocating movement in like manner to the FIG. 1 embodiment, the resilience of the washers 40 biasing the valve member 18 to its median position, the washers 40 being susceptible to the back-pressures in the output ports 36 and 38 to move the valve member 18 as described in detail with reference to FIG. 1. Thus the FIG. 2 embodiment functions in substantially identical manner to the functioning of the FIG. 1 embodiment, and may also be modified in like manner.

Other modifications and variations of the structure and use are possible within the scope of the invention.

While the preferred fluid medium for use with the fluid control means in accordance with the invention is hydraulic oil, other liquids (for example, water) may be used, or gases may be used (for example, compressed air).

I claim:

1. A fluid flow divider comprising a generally symmetrical valve member having two seats and being resiliently mounted for movement between outflow passages with which said seats respectively cooperate, a fluid input port connected to the input sides of both valve seats, the resilient mounting means presenting on one side and the other side thereof appreciable respective areas to fluid pressure in the outflow passages downstream of said seats, said valve member being disposed in a body having a bore therein, the inner extremity of which provides one outflow passage and a plug for said bore being arranged to retain means for the resilient mounting of the valve member and provide the other outflow passage.

2. A fluid flow divider as claimed in claim 1, wherein means providing the resilient mounting comprises a pair of resilient washers clamping a peripheral projection around the valve member.

3. In a fluid flow divider having a valve member movably supported within a body to control fluid communication between a single input port and a pair of output ports defined within said body, the improvement wherein said body includes a blind bore forming said input port and a chamber extending outwardly from said blind bore, said valve member being substantially disposed within said chamber to separate said chamber into a first cavity communicating with one of said output ports and a second cavity communicating with said other output port, said one output port communicating directly with said input port via said first cavity, said other output port communicating indirectly with said input port via said second cavity and via a passage within said valve member, and said valve member defining a substantially cylindrical center portion forming said passage and coaxial with said blind bore, whereby movement of said valve member along the axis of said blind bore varies the fluid communication between said input port and said pair of output ports.

* * * * *